(No Model.)  3 Sheets—Sheet 1.
G. L. WINCH.
SECONDARY BATTERY.
No. 300,933.  *Fig 7*  Patented June 24, 1884.
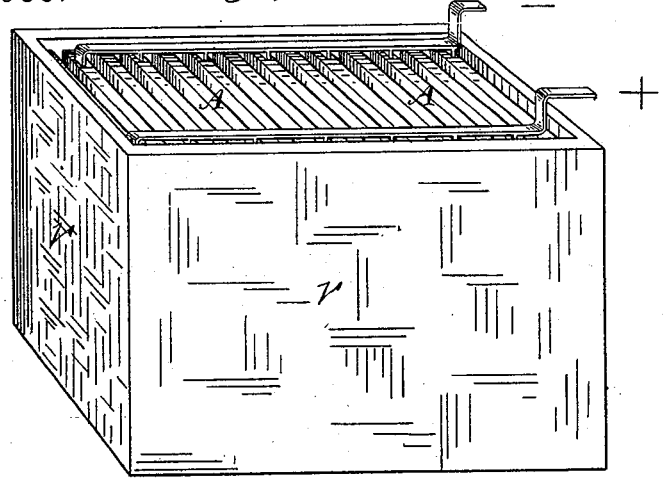
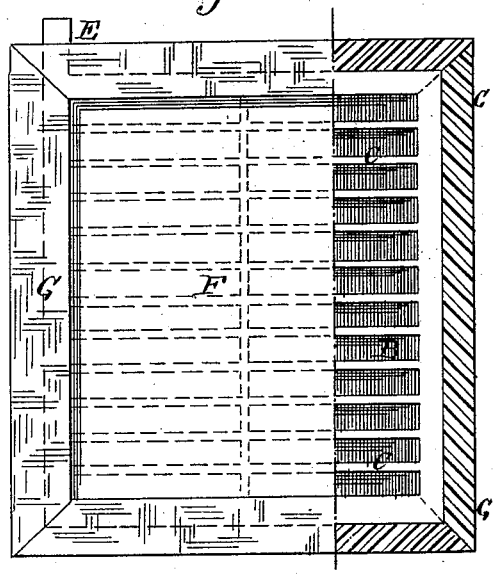
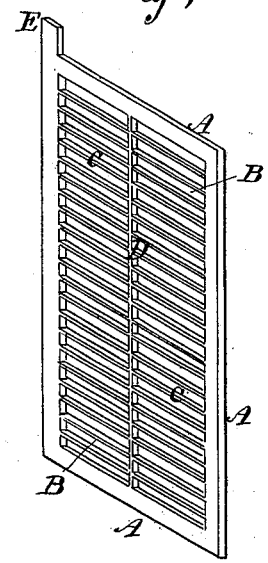
Attest,
René Geelhaar
E. Litmulgutz
Inventor;
George Lawrence Winch
by Briesen & Swys his Atty (No Model.)  3 Sheets—Sheet 2.
G. L. WINCH.
SECONDARY BATTERY.
No. 300,933. Patented June 24, 1884.
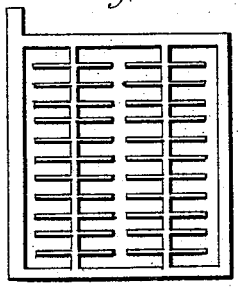
Fig 1ᵈ
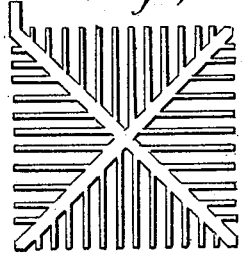
Fig 1ᵇ
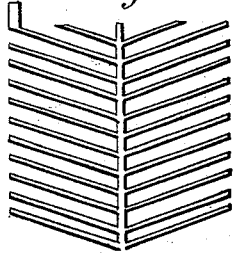
Fig 1ᶜ
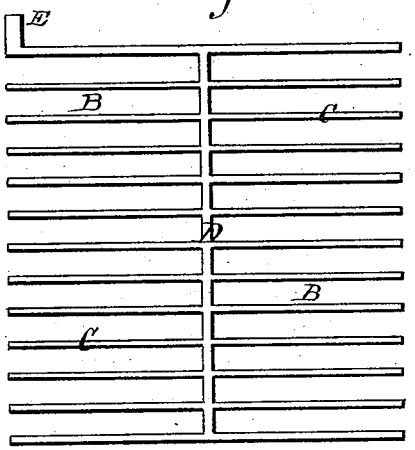
Fig 1ᵃ
Attest:
René Geelhaar
E. [illegible]
Inventor:
George Lawrence Winch
by Brandenburg & Co. Atty (No Model.) 3 Sheets—Sheet 3.
G. L. WINCH.
SECONDARY BATTERY.
No. 300,933. Patented June 24, 1884.
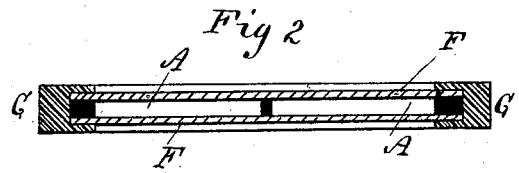
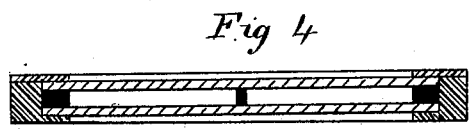
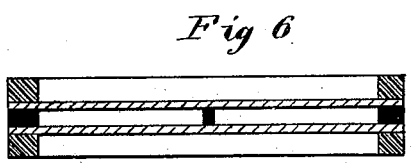
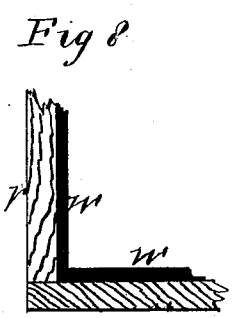
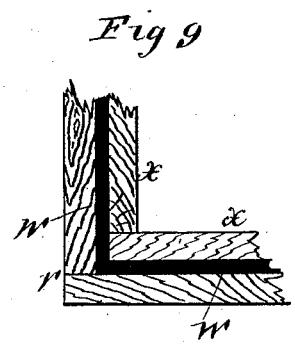

UNITED STATES PATENT OFFICE.

GEORGE L. WINCH, OF MADRAS, EAST INDIES.

SECONDARY BATTERY.

SPECIFICATION forming part of Letters Patent No. 300,933, dated June 24, 1884.

Application filed July 18, 1883. (No model.) Patented in England July 25, 1882, No. 3,532; in France January 25, 1883, No. 153,313, and in Belgium January 27, 1883, No. 60,276.

*To all whom it may concern:*

Be it known that I, GEORGE LAWRENCE WINCH, of Madras, East Indies, but at present of No. 22 Southampton Buildings, Chancery Lane, in the county of Middlesex, England, have invented certain new and useful Improvements in Secondary or Polarization Batteries for the Storage of Electric Energy, of which the following is a specification.

This invention relates to what is known as "secondary electric batteries," which are incapable themselves of producing electricity, but which become electrical storage-batteries when charged from some other source—such as a galvanic battery or dynamo-electric machine.

The novel points of my invention are, first, the use of cork or vegetable pith as a protection to the deposits and chemical formations upon the plates constituting the electrodes of my battery; second, the use of the aqueous solutions of the salts of aluminum, or of the double salts of alum, as electrolytic fluids, or also the use of the aqueous solution of any of said salts with sulphate of copper, or with sulphate of zinc, as electrolytic fluid, and in conjunction with any of these electrolytic fluids the electrodes consisting of plates of lead, or, instead thereof, electrodes consisting of alternate plates of lead and copper, or also of alternate plates of lead and zinc.

In my novel battery I use metal electrodes immersed in some electrolytic fluid, and said electrodes consist of either plates of lead placed together with their faces parallel to each other, but each plate separated from the other by a layer of insulating substance, or alternate plates of lead and copper, or alternate plates of lead and zinc, which plates are also separated from each other by some insulating substance, but so as to allow free circulation of the electrolytic fluid, and to prevent contact of plates with each other. The plates are arranged in pairs, and may be placed horizontally, perpendicularly, or diagonally, as found most advantageous, each pair, however, separated from the next pair in the same way as the single plates are. The method of separation and insulation may be by grooves in the frame-work of the surrounding vessel, in which grooves the plates are shoved in, and the interstices between the plates may be filled with sawdust or other inert substance.

The plates of lead may consist of sheet-lead, either perforated or intact, or may be cast in the required shape with perforations or cells extending partially or entirely through the plates, and the plates of copper or zinc may consist of sheet-copper or sheet-zinc, perforated or intact.

With a view to prevent the metallic deposits and oxides from becoming detached from the plates, a sheet of cork or vegetable pith is closely attached to the faces of the plates, said sheets of cork being held in position by means of sawdust or other inert substance put in the interstices between the plates. The plates so put together are inserted in a suitably-shaped water-tight vessel of wood, lead, or iron, protected by varnish or other coating material, for preventing corrosion or leakage, and the plates are alternately connected with each other in what is called the "multiple arc," in the case of copper or zinc plates being used in combination with lead plates, the copper or zinc plates forming the negative electrodes of the exciting source of electric energy when being charged with the electric current, and the plates of lead the positive electrodes.

It is preferable to construct a battery in such a manner that the plates or cells attached to one pole of the exciting-battery or source of electric energy are all of similar metals or combinations. The terminals of the plain or cellular grated plates may be prolongations of the same, or may be cast into them, or attached to them by welding, soldering, or any convenient manner, and may consist of lead, copper, or other conducting material. These terminals may be used as supports and as conductors, and may be of any form.

The fastening of the cork sheets on the metal plates may consist of wooden or vulcanized fiber pegs, rivets, or screws, or by using glue or cement of a character to resist the corroding and destructive influence of the acid or other solutions with which they may come into contact; or the several parts may be held in position by pressure exerted by wedges.

In my battery I use as electrolytic fluid the dilute solution of the salts of aluminum, or of the double salts of alum, either separately or each in conjunction with sulphate of copper or with sulphate of zinc, so that the aqueous dilute solution of either of the chemicals given in the following table may be taken as electrolytic fluid for either combination of electrodes given in the above: One, sulphate of copper and sulphate of aluminum; two, sulphate of copper and potash alum; three, sulphate of copper and soda alum; four, sulphate of copper and ammonia alum; five, sulphate of zinc and sulphate of aluminum; six, sulphate of zinc and potash alum; seven, sulphate of zinc and soda alum; eight, sulphate of zinc and ammonia alum; nine, sulphate of aluminum; ten, potash alum; eleven, soda alum; twelve, ammonia alum.

In the accompanying drawings, Figure 1 represents a detached view, in perspective, of one form of a perforated or cellular plate of lead, copper, or zinc. A is the plate. B are the cells, and C the gratings. D represents a support, and E the terminal, which may be obviously extended.

Figs. $1^a$, $1^b$, $1^c$, and $1^d$ show other modifications of the form of plates, to which similar letters of reference refer.

Fig. 2 shows a cross-section through a plate when clamped and secured in its frame G. In this case a piece or plate of cork, F, or of pith is placed, one on each face of plate A, A and F being firmly held together by rivets or pegs, or similar fastenings, and being shoved into the groove of frame G, either before or after the frame has been put together, as may be most convenient, and the top is then fastened to the two sides or uprights of the frame by means of strips of wood or other material.

Fig. 3 shows a completed frame in front elevation and partly in section, similar letters of reference referring to it.

Fig. 4 is a cross-section of a rabbeted frame for receiving such prepared plate, the process of construction being in the following order: Into the rabbeted frame is laid a piece or plate of cork or pith, upon this the lead, copper, or zinc plate, and upon this again a sheet of cork or pith, and over this strips of wood are placed overlapping the edge of the cork and covering the upper side of the frame, and thus forming a grooved frame when riveted or otherwise secured together.

Fig. 5 shows a cross-section of a plain frame. In this case the cork is placed, as before, below and above the prepared cellular grated plate, and the three-sided frame is placed round the same. Strips of wood wider than the wooden frame are then attached so as to form a complete four-sided frame, holding and clamping the plate and the cork in the groove thus formed.

Fig. 6 shows a cross-section of a plate with the cork placed on either face of the plate, and with strips of wood attached to either side.

A perspective view of a battery is shown at Fig. 7, in which the connections are shown, and where the terminals can obviously be modified, V representing the surrounding vessel containing the electrodes immersed in the electrolytic fluid.

Figs. 8 and 9 show how the walls of the surrounding vessel are protected against corrosion or leakage by a suitable coat of varnish or hydro-carbonaceous material W, X representing a mold or inner vessel, which may be used for pouring said material in a fluid state into the vessel V, between the walls of vessel X and V. The liquid or plastic mass of hydrocarbonaceous material or compound may be retained in a fluid state while the mold is in for a more or less protracted period by solvents or heat, to insure a more complete incorporation with the surrounding vessel or vessels.

I am well aware that this mode of coating the surrounding vessel is not new, and I do not lay any claim on this; but

What I claim, and want to secure by Letters Patent, is—

1. In a secondary or polarization battery, the combination of metallic plates forming the electrodes, and sheets of cork or pith covering the faces of said plates, substantially as shown, and for the purpose set forth.

2. In a secondary or polarization battery, the combination of electrodes consisting of metallic plates immersed in an electrolytic fluid, consisting of an aqueous solution of salts of aluminum with sulphate of copper, substantially for the purpose shown and described.

In testimony whereof I hereunto sign my name, in the presence of two subscribing witnesses, this 24th day of April, 1883.

G. L. WINCH.

Witnesses:
 EDWD. W. D. REYMIO,
 CHARLES HOCKLEY,